United States Patent

Goldberg et al.

[11] 3,835,863
[45] Sept. 17, 1974

[54] T TUBE
[75] Inventors: Edward M. Goldberg, Glencoe; Seymour Bazell, Morton Grove, both of Ill.
[73] Assignee: MPC/KurgiSil, Skokie, Ill.
[22] Filed: May 15, 1973
[21] Appl. No.: 360,579

[52] U.S. Cl............................................. 128/350 R
[51] Int. Cl............................................. A61m 25/00
[58] Field of Search........................ 128/350 R, 348

[56] References Cited
UNITED STATES PATENTS
2,618,271  11/1952  Wallace................... 128/350 R
2,819,719  1/1958  Utley et al.................. 18/350 R FOREIGN PATENTS OR APPLICATIONS
666,090  7/1963  Canada........................... 128/350 R Primary Examiner—Dalton L. Truluck
Attorney, Agent, or Firm—Molinare, Allegretti, Newitt & Witcoff

[57] ABSTRACT

A flexible surgical T tube with a continuous open slit extending across the top of the cross tube is disclosed. This improved T tube allows the tube to be removed from a duct after surgical implantation by simple non-surgical withdrawal while minimizing wound stress and trauma in the duct.

3 Claims, 6 Drawing Figures

PATENTED SEP 17 1974 3,835,863

T TUBE

BACKGROUND OF THE INVENTION

This invention pertains to surgical T tubes, particularly flexible surgical T tubes for surgical implantation in an internal duct for drainage that are to be subsequently removed by non-surgical withdrawal.

Surgical T tubes are often implanted in internal ducts or tubular vessels of a surgical patient as a conduit to splint or provide drainage and fluid removal after surgery. For example, T tubes are often implanted in the bile ducts for bile drainage and splinting after biliary duct surgery. These T tubes are then intended to be removed, when their function is complete, by non-surgical techniques, i.e., simply pulling the T tube out of the duct.

The T tubes now commonly used comprise a base tube integrally connected at right angles to a cross tube of substantially equal diameter, hence the term "T tube." The cross tube is open at both ends and communicates with an opening in the top of the base tube. The cross tube portion of the T tube is implanted in the duct by making a surgical incision along the longitudinal axis of the duct of sufficient length to allow insertion of the cross tube. In a typical T tube wherein the base tube is connected to the cross tube at the midpoint of the cross tube, this incision is about one-half the length of the cross tube. Proper back and forth manipulation of the tube in the duct allows the entire length of the cross tube to be inserted without the necessity of an unduly long incision. The incision is then sutured shut to provide a tight seal about the base tube thereby preventing undesired internal leakage.

When the implantation of these prior art T tubes is no longer needed, physical removal by pulling often causes unnecessary wound stress and trauma in the duct. This stress and trauma is due to the fact the opening in the duct is the same diameter as the base tube. However, the combined diameter of each arm of the cross tube is twice the diameter of the base tube when the cross tube is folded and withdrawn from the duct. Folding is possible because of the flexibility of the cross tube. This allows the arms of the cross tube to fold to a substantially parallel position when the tube is withdrawn through the opening in the duct.

A further possible disadvantage of these prior art T tubes is that the only openings for entry into the tube for drainage are at either end of the cross tube. One or both of these open ends often plug up when implanted. This requires irrigation to remove the plug or occlusion and in extreme cases, the insertion of a new tube by surgical techniques.

OBJECTS AND SUMMARY OF THE INVENTION

It is an object of this invention to provide a surgical T tube that can be readily removed when implanted in an internal duct with a minimum of wound stress and trauma.

It is another object of this invention to provide a surgical T tube that can drain an internal duct when implanted with a minimum of occlusion or plugging problems that can interfere with drainage.

It is a specific object of this invention to provide a surgical T tube wherein the arms of the cross tube telescope within each other when the implanted tube is removed from an internal duct.

In a broad embodiment, therefore, these objects and others are provided by an improved flexible T tube construction which comprises a continuous open slit across the top of the cross tube that extends from one end of the cross tube to the other end. This slit allows the arms of the cross tube to telescope longitudinally when the arms are folded together to provide a diminished cross sectional area which minimizes wound stress and trauma upon withdrawal from the duct. The telescoping effect is preferably enhanced by providing a V-shaped or U-shaped notch in both walls of the slit cross tube at the midpoint of the tube, i.e., above the intersection of the top opening of the base tube and the cross tube.

The slit across the top of the tube can be either aligned or partially misaligned. The partially misaligned structure is particularly preferred since it allows the arms of the cross tube to substantially instantaneously telescope on withdrawal since the edge of one slit, when folded, is directly opposite the opening in the opposite slit. As used herein, "aligned" refers to a slit wherein the edges of the slit are straight and parallel along the entire length of the cross arm. "Partially misaligned" refers to when the edges of the slit in each arm are not in alignment but a straight line can still pass from one end of the cross arm to the other end.

Other objects and embodiments will appear in the following description of the invention and reference to the attached drawings.

DETAILED DESCRIPTION OF THE INVENTION

Figure 1:
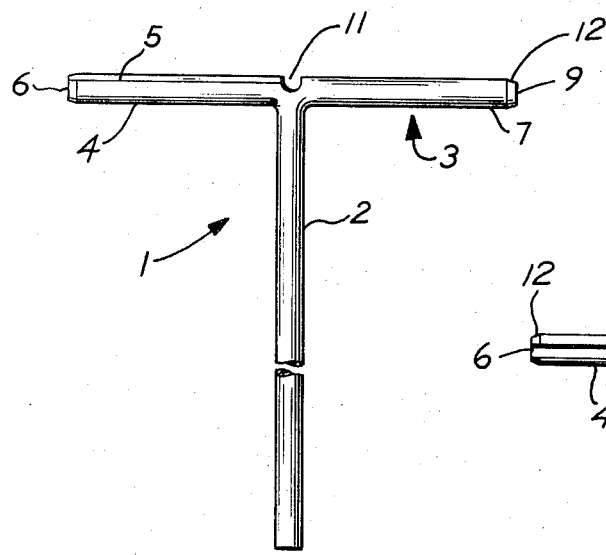
FIG. 1 is a front view of the improved T tube of the present invention.
Figure 2:
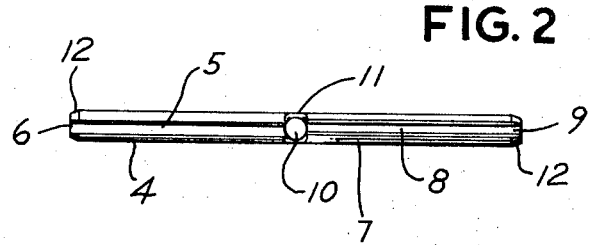
FIG. 2 is a top view of the improved T tube of the present invention illustrating the continuous slit across the top of the tube.
Figure 3:
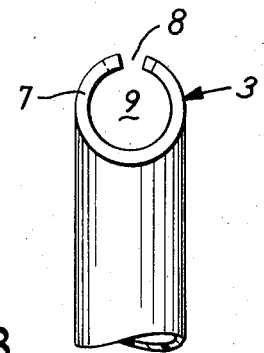
FIG. 3. is an enlarged right end view of the slit cross tube.

Referring first to FIGS. 1 and 2, there is illustrated a flexible surgical T tube 1 according to the present invention as manufactured from a conventional body compatible silicone rubber. T tube 1 comprises an integrally molded base tube 2 and cross arm 3. Cross arm 3 is further defined by left arm 4 and right arm 7 positioned on either side of notch 11 and having openings 6 and 9 respectively at the end of each arm. Left slit 5, right slit 8 and notch 11 cooperate to form a slit that extends across the entire top of cross tube 3. This slit can be formed in a molding process as used to make the unitary tube or by cutting away a portion of cross tube 3. It should be noted that left slit 5 and right slit 8 are partially misaligned, i,e., the bottom edge (FIG. 2 and 3) of right slit 8 is aligned with the open gap of left slit 5 and is not aligned with the bottom edge of slit 5.

Figure 4:
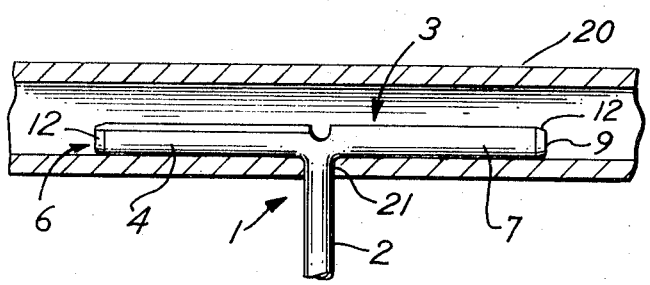
FIG. 4 is a partial front sectional view illustrating the surgical implantation of the T tube in an internal duct (enlarged).

Referring to FIG. 4, the T tube 1 of the present invention is inserted in an internal duct 20 by making a longitudinal surgical incision along the duct and implanting the cross arm 3 therein. Beveled or rounded edges 12 facilitate this insertion. The incision is then sutured closed around base tube 2 to inhibit fluids from exiting at this point. The duct is drained by fluids entering openings 6 and 9 and slits 5 and 8 of cross tube 3. The fluids then flow out of cross tube 3 through opening 10 and through base tube 2 to a suitable collection device. Because of the large additional surface area for drainage provided by slits 5 and 8, there is little, if any, propensity for the T tube to plug or occlude.

Figure 6:
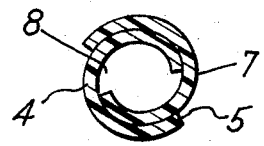
FIG. 6 is an enlarged top sectional view taken along section line 6—6 of FIG. 5 illustrating the telescoping of the cross tube on withdrawal from the duct.
Figure 5:
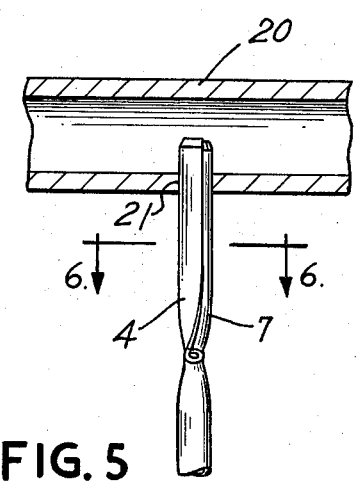
FIG. 5 is a partial front sectiona view illustrating the withdrawal of the T tube from the duct.

After the T tube has satisfied its function as a temporary drain, it is removed from duct 20 by pulling as illustrated in FIGS. 5 and 6. As the tube is pulled out, arms 4 and 7, assisted by notch 11, fold upward together and telescope within each other as detailed in FIG. 6. As the tube is withdrawn, the area occupied by the two telescoped arms is considerably less than would be presented to the wound by two side by side positioned tubes. As a consequence, wound stress and trauma are minimized.

It should be understood that various modifications within the scope of this invention can be made by one of ordinary skill in the art without departing from the spirit thereof. Therefore, the invention should be defined by the following claims as broadly as the prior art will permit and in view of the specification if need be.

We claim as our invention:

1 In a flexible surgical T tube for surgical insertion into an internal duct of a patient such as the hepatic duct having a flexible base tube and a flexible cross tube interconnected thereto to provide a T tube having communicating openings on all ends of the T, the improvement which comprises a continuous open slit across the top of the cross tube extending from one end of the cross tube to the other end of the cross tube and an outwardly facing U-shaped notch positioned above the top opening of the base tube and in the side walls of the cross tube, said slit further characterized in that the portions of the slit in the cross tube on either side of the notch are partially misaligned wherein the edge of one slit portion telescopes between the edges of the slit of the other slit portion when the cross tube is folded together on withdrawal thereby facilitating the removal of the tube from the duct by minimizing wound stress and trauma.

2. An improved T tube according to claim 1 wherein said tube is an integrally formed silicone rubber tube.

3. An inproved T tube according to claim 1 wherein each end of the cross tube is rounded.

* * * * *